March 28, 1950 R. W. SKOOG ET AL 2,502,106
DENSIFYING OF CARBON BLACK
Filed Dec. 21, 1944
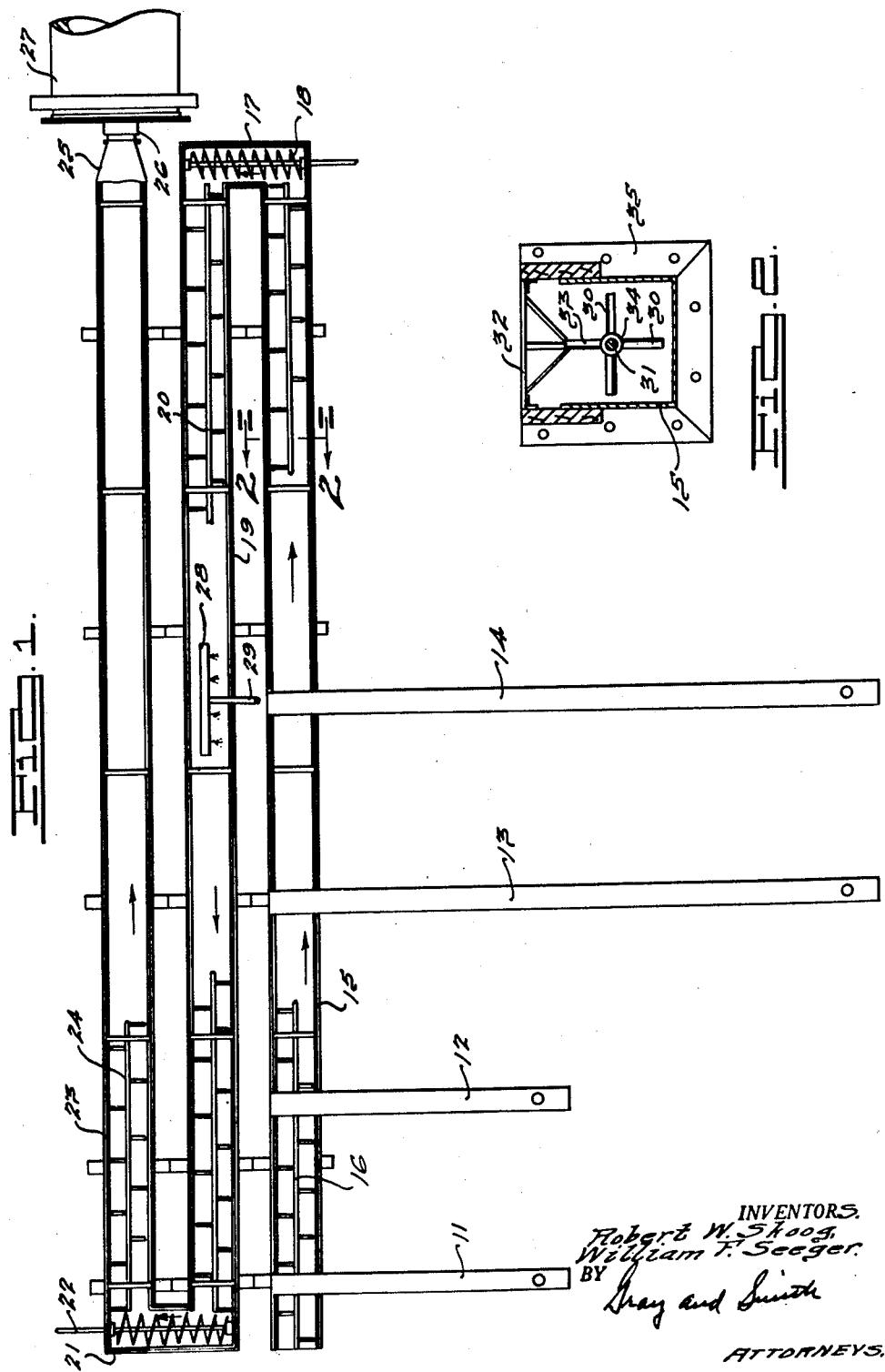
INVENTORS.
Robert W. Skoog,
William F. Seeger.
BY
Gray and Smith
ATTORNEYS.

Patented Mar. 28, 1950

2,502,106

UNITED STATES PATENT OFFICE 2,502,106

DENSIFYING OF CARBON BLACK

Robert W. Skoog, Borger, and William F. Seeger, Corpus Christi, Tex., assignors to United Carbon Company, Inc. (Maryland), Charleston, W. Va., a corporation of Maryland Application December 21, 1944, Serial No. 569,252

8 Claims. (Cl. 259—109)

The present invention relates to the agglomeration of finely divided flocculent powders, such for example as carbon black, for the purpose of increasing its apparent density. In one embodiment, the apparatus may be used to increase the apparent density of the materials prior to forming it into the small spherical masses which may be handled in bulk handling apparatus and shipped in bulk handling equipment, such for example as tank cars and the like. Increasing the apparent density of such materials prior to the formation of the small spherical agglomerates increases the efficiency of the subsequent agglomerating treatment. The present invention also permits reducing a given mass of flocculent powders, to a fraction of its untreated bulk or volume without substantial impairment of its dispersion properties.

As an important example of the present invention carbon black may be taken as the finely divided flocculent powders to be treated. The term "carbon black" as used herein, is used in its broadest sense to include lamp black, gas black produced in any desired manner and other carbon black substitutes commonly employed as pigments or fillers. It is to be understood, however, that the apparatus of the present invention may be successfully utilized to increase the apparent density of other finely divided materials of a flocculent nature to better adapt it for storage, shipment and use.

It is, therefore, a principal object of the present invention to provide an apparatus for increasing the apparent density of flocculent powders to facilitate the subsequent packing or the formation therefrom of shaped agglomerates capable of ready and uniform dispersion in a selected dispersion medium.

It is a further object of the present invention to provide an apparatus adapted for use to facilitate the manufacture of agglomerated flocculent powders, such as carbon black, on an economical and commercial basis to assure a large scale production of commercially acceptable agglomerates.

It is a further object of the present invention to provide an apparatus to facilitate the commercial manufacture of agglomerates of finely divided powders in a continuous operation, in which the agglomerated material is fed in a predetermined path toward the discharge end of the apparatus in such a way as to assure a substantially uniform treatment of all the powders passing through the said apparatus.

A further object of the present invention is to provide an improved apparatus for densifying flocculent powders prior to the formation of aggregates therefrom.

Carbon black is an important material in many technical industries and the apparatus of the present invention has a particular application in facilitating the agglomeration of finely divided carbon black particles. As originally produced, carbon black may have an apparent density of from approximately three pounds to approximately ten pounds per cubic foot.

The apparatus of the present invention is particularly adapted for increasing the apparent density of a finely divided powder, such as carbon black, before it is introduced into apparatus to form balls or spherical agglomerates therefrom. The apparatus of the present invention may, if desired, be used with any of the forms of agglomerating apparatus disclosed in Patent No. 2,422,989, and my Patent No. 2,480,782, dated August 30, 1949. The apparatus of the present invention provides a method of densifying and partially agglomerating the carbon black while conveying it from carbon black manufacturing apparatus, precipitators or collectors. The apparatus of the present invention combines both a propelling and stirring operation so that the powders are simultaneously conveyed and densified, the densifying being such as to increase the apparent density of the powders to from two to three times their initial or entering weights. For example, when carbon black in a flocculent condition is continuously fed to the propeller conveyor at an apparent density of approximately eight pounds per cubic foot, it may in the apparatus of the present invention be increased to an apparent density of approximately nineteen pounds per cubic foot prior to entering the agglomerating drums or pelleting apparatus. This pretreatment of the carbon black in the apparatus of the present invention is very desirable for by increasing the apparent density of the carbon black, it is possible to increase the efficiency of the pelleting or agglomerating drums and to increase in this way the output of pelleted or agglomerated carbon black from an agglomerator or other apparatus of a given capacity.

Other objects of the present invention will appear in the following description and appended claims, reference being had to the accompanying drawings forming a part of this specification wherein like reference characters designate corresponding parts in the several views.

In the drawings:

Fig. 1 is a schematic plan view of the apparatus embodying the present invention.

Fig. 2 is a sectional view taken substantially on the line 2—2 looking in the direction of the arrows of Fig. 1.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

As an example of the finely divided solids with which the apparatus of the present invention is to be particularly utilized, carbon black will be considered. As carbon black is produced in the carbon black manufacturing apparatus, it is conventionally manufactured in apparatus which for mechanical reasons is distributed over relatively large areas. Before treating the carbon black to increase its apparent density and to form agglomerates thereof, the finely divided flocculent carbon black must be collected from the carbon black manufacturing apparatus and delivered to the packing house or agglomerating plant. According to the present invention, this is accomplished by the propeller conveyor apparatus herein disclosed in which the propelling and stirring action are so combined that the carbon black is simultaneously conveyed and densified.

In the preferred embodiment shown schematically in Fig. 1 of the drawings, carbon black is discharged from collectors through the conveyors 11, 12, 13 and 14, and is discharged into an elongated rectangular trough 15 in which an impeller shaft 16 is rotatably mounted. The conveyor trough 15 discharges into a header trough 17, in which a screw conveyor 18 is rotatably mounted to feed the partially densified carbon black to a second rectangular trough here indicated by the numeral 19. In this trough there is mounted a rotary impeller 20. The trough 19 discharges into a header trough 21 in which is mounted a rotating screw conveyor 22 for delivering the further densified carbon black to a rectangular trough 23, in which a rotating impeller 24 is mounted. From the end of the rectangular trough 23 the densified carbon black is discharged into a chute 25 which delivers the densified carbon to the intake chute 26 of any desired type of agglomerating apparatus, such for example as the agglomerating drum 27.

If desired, the densifying of the carbon black in the apparatus herein disclosed may be accelerated and the pelleting operation initiated in the rectangular trough 15, 19 and 23 by wetting the carbon black with water through a suitable drip pipe 28 operatively connected with a source of water 29. This is preferably carried out about midway of the length of the propeller conveyor apparatus of the present invention, i. e. about midway of the trough 19, although considerable latitude exists as to the point at which such water may be introduced. In one instance water to the extent of approximately one per cent by weight of the black was introduced into the trough 19. Due to the heat of the black and the friction generated in the apparatus of the present invention, approximately one-half of the added water was driven off before the black was discharged to the chute 25. The black, for all practical purposes, is therefore a "dry" black at this point, having less than approximately one-half per cent of water therein.

In a preferred arrangement, the impeller shafts 16, 20 and 24 are each formed with propellers in the form of flat bars or arms 30 mounted at approximately a 45 degree angle to the axis of the shafts 31. The bars or arms 30 are spaced approximately 3 inches apart axially. The bars or arms 30 are arranged transversely to extend at an angle of approximately 90° to the axis of the shaft 31 and are spaced with relation to each other in such a manner as to form a helix running clockwise to a shaft running in a counterclockwise direction when facing the discharge end of the conveyor.

While any desired type of construction may be employed, we have found that the troughs 15, 19 and 23 may suitably be formed of a wood construction supported at predetermined intervals by a plurality of steel supporting brackets 35. The conveyors are suitably formed of steel or similar metal construction preferably a metal which is not affected by the carbon black or the water when used. One suitable material is stainless steel and its use is recommended. If, however, stainless steel is not available, we have found that ordinary steel which has been covered with a protective enamel is suitable for the construction of the conveyors.

With the impeller shafts 16, 20 and 24, rotating in a clockwise direction when facing the discharge end of the conveyor and with the left-hand helix formed thereon, as previously described, it has been found that the apparent density of the flocculent carbon black at a chosen point in the impeller conveyor follows in general the mathematical relation $$D = \frac{K \times W}{V \times d^2}$$

in which D is the density of the black after treatment, K is a factor depending upon the depth of carbon black powder in the conveyor, W is the rate at which the product is being entered into the conveyor in mass or weight per unit of time, V is the rate of linear movement of the product and $d$ is the diameter of the circles scribed by the impellers.

In a preferred construction in accordance with the above formulae, the troughs 15, 19 and 23 each have been formed as rectangular boxes approximately 12 inches square, each having a length of approximately 25 feet. Thus the carbon black travels a total distance in excess of approximately 75 feet in traveling through the three troughs 15, 19 and 23, such as is here shown. It is to be understood, however, that any desired length of travel may be employed and that in general if all other operating conditions are maintained constant, the apparent density of the carbon black will be progressively increased up to approximately nineteen pounds per cubic foot as the conveyor is lengthened. The diameter through the conveyor shafts, i. e. from the end of one arm 30 through the end of the arm 30 spaced 180° therefrom, is approximately ten inches and this is the diameter of the circle scribed by the impellers. When using this construction by way of example, carbon black in a flocculent condition was fed to the propeller conveyor at an apparent density of approximately eight pounds per cubic foot, and was conveyed a distance of approximately 75 feet with the impeller shafts 16, 20 and 24 turning at approximately 50 R. P. M. Under these conditions, the apparent density of the carbon black at the discharge end of the trough was found to be approximately nineteen pounds per cubic foot.

By the present invention it will be seen that we have provided a novel apparatus which will effect a densifying of finely divided powder for the purpose of facilitating the subsequent agglomeration of the material. It is to be understood that the relative dimensions herein mentioned may be varied as required and that the number of impeller blades 30 used on the impeller shafts may be varied as to number, size or shape, for the purpose of facilitating the densifying action. It is also to be understood that the shape and size of the impeller blades may be varied if desired at different points in the conveyor length so as to effect particular types of densification of the carbon black.

We have found that the use of wooden trough conveyors as herein disclosed eliminates a great deal of contamination of the black due to corrosion, metal scale and the like or similar impurities which frequently fall from a ferrous metal conveyor and drop into the carbon black.

The apparatus of the present invention also eliminates or reduces the number of agitators, tanks or the like which would otherwise be required in the subsequent agglomeration of the carbon black. An advantage of the present apparatus is that the carbon black is given a sufficiently high density so as to increase its apparent density and to eliminate many of the problems of the handling of it as a light flocculent dusty powder. The black when discharged into the chute 25 is in a loose form with little or no apparent change in the physical appearance or shape of the individual black particles.

The apparent density of the carbon black as a result of its travel through the present apparatus, is controlled by varying the length and shape of the conveyor, by varying the construction of the impeller shafts, by varying the speed of rotation of the impeller shafts, and by varying the rate of feeding of the carbon black to the conveyor. By varying these factors, the apparent density of the carbon black may be increased to a weight within the limits of approximately two to approximately three times its initial or entering weight.

The use of a rectangular trough in the conveyor has been found to be particularly desirable since it assures an agitating of the carbon black as it moves through the conveyor due to the fact that there is a constant cascading of the carbon black into the corners of the trough and a movement of the carbon black out of the corners of the trough into the path of the impeller blades.

The shafts 31 of the conveyors 16, 20 and 24 are suspended in the troughs 15, 19 or 23 by overhead suspension brackets 32, each of which carries a hanger arm 33 and a bearing 34 so as to support the impellers 16, 20 and 24 with the ends of the blades 30 spaced a predetermined distance from both the sides and the bottom of the rectangular troughs.

We claim:

1. An apparatus for increasing the apparent density of a flocculent powder and comprising an elongated rectangular trough, a cover for said trough, an impeller shaft rotatably journaled in bearings carried by said cover and suspended in said trough, impeller arms secured to said shaft and rotatable therewith, and having their ends spaced equally from the sides and bottom of said rectangular trough, said impeller arms extending approximately at right angles to the longitudinal axis of said shaft, and being equally spaced on a spiral path extending longitudinally of said impeller shaft in a direction opposite to the direction of rotation of said shaft.

2. An apparatus as claimed in claim 1 and further characterized in that the interior of said rectangular trough is approximately twelve inches square and the trough is formed in three sections each having a separate impeller shaft therein and having a total length of approximately seventy-five feet.

3. An apparatus as claimed in claim 1 and further characterized in that the interior of said rectangular trough is approximately twelve inches square, and said impeller arms inscribe a circle therein approximately ten inches in diameter.

4. An apparatus for increasing the apparent density of a flocculent powder and comprising an elongated rectangular trough, a cover for said trough, an impeller shaft rotatably journaled in bearings depending from said cover and suspended in said trough, impeller arms secured to said shaft and rotatable therewith, and having their ends spaced equally from the sides and bottom of said rectangular trough, said impeller arms extending approximately at right angles to the longitudinal axis of said shaft, and being equally spaced on a spiral path extending longitudinally of said impeller shaft and in a direction opposite to the direction of the intended rotation of said shaft, said impeller arms each comprising a flat blade mounted with its flat faces turned at an angle of approximately 45 degrees to the axis of said impeller shaft.

5. An apparatus as claimed in claim 4 and further characterized in that said trough comprises three separate sections each having a separate impeller shaft therein and each having an inside dimension of approximately twelve inches square and a length of approximately twenty-five feet, the said impeller arms being formed to scribe a circle approximately ten inches in diameter inside said trough.

6. An apparatus for increasing the apparent density of a flocculent powder and comprising a series of separate communicating elongated rectangular troughs, a removable cover for each of said troughs, an impeller shaft rotatably journaled in bearings mounted on said removable covers and suspended in each of said troughs, impeller arms secured to each of said shafts and rotatable therewith, and having their ends spaced equally from the sides and bottom of said rectangular troughs, said impeller arms each extending approximately at right angles to the longitudinal axis of the shaft on which it is mounted and being equally spaced from other of said arms in a spiral path extending longitudinally of said impeller shaft, said spiral path extending about said shaft in a direction opposite to the intended direction of rotation thereof.

7. An apparatus as claimed in claim 6 and further characterized in that each of said troughs has an inside dimension of approximately twelve inches square and is approximately twenty-five feet in length and said impeller arms scribe a circle therein of approximately ten inches in diameter.

8. An apparatus as claimed in claim 6 and further characterized in that said impeller arms each comprise a flat blade mounted with its flat faces turned at an angle of approximately 45 degrees to the axis of said impeller shaft.

ROBERT W. SKOOG.
WILLIAM F. SEEGER.

REFERENCES CITED

The following references are of record in the file of this patent:

UNITED STATES PATENTS

| Number | Name | Date |
|---|---|---|
| Re. 21,379 | Glaxner | Mar. 5, 1940 |
| 66,377 | Naquin et al. | July 2, 1867 |
| 114,050 | Schultdrees | Apr. 25, 1871 |
| 307,275 | Edmondson | Oct. 28, 1884 |
| 932,789 | Kritzer | Aug. 31, 1909 |
| 2,120,540 | Billings | June 14, 1938 |
| 2,120,541 | Billings | June 14, 1938 |
| 2,131,686 | Heller et al. | Sept. 27, 1938 |
| 2,288,087 | Hanson et al. | June 30, 1942 |